US007260818B1

(12) United States Patent
Iterum et al.

(10) Patent No.: US 7,260,818 B1
(45) Date of Patent: Aug. 21, 2007

(54) SYSTEM AND METHOD FOR MANAGING SOFTWARE VERSION UPGRADES IN A NETWORKED COMPUTER SYSTEM

(75) Inventors: Skef F. Iterum, San Francisco, CA (US); Mark T. Hashimoto, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 790 days.

(21) Appl. No.: 10/449,584

(22) Filed: May 29, 2003

(51) Int. Cl.
*G06F 9/44* (2006.01)
(52) U.S. Cl. ............... 717/170; 717/102; 717/120; 717/169; 717/172
(58) Field of Classification Search ........ 717/120–122, 717/102–103, 168–173; 719/328–329
See application file for complete search history.

(56) References Cited

U.S. PATENT DOCUMENTS

| | | | | |
|---|---|---|---|---|
| 5,901,320 A | * | 5/1999 | Takahashi et al. | 717/170 |
| 5,926,636 A | * | 7/1999 | Lam et al. | 719/313 |
| 6,163,855 A | * | 12/2000 | Shrivastava et al. | 714/4 |
| 6,769,008 B1 | * | 7/2004 | Kumar et al. | 709/201 |
| 6,983,324 B1 | * | 1/2006 | Block et al. | 709/228 |
| 7,003,587 B1 | * | 2/2006 | Battat et al. | 709/227 |
| 7,069,541 B2 | * | 6/2006 | Dougherty et al. | 717/122 |
| 2001/0008024 A1 | * | 7/2001 | Inaba | 717/11 |
| 2003/0074426 A1 | * | 4/2003 | Dervin et al. | 709/220 |
| 2004/0216133 A1 | * | 10/2004 | Roush | 719/316 |
| 2004/0254984 A1 | * | 12/2004 | Dinker | 709/205 |

OTHER PUBLICATIONS

Ellard T. Roush, "Cluster Rolling Upgrade using Multiple Version Support," cluster, p. 63, 3rd IEEE International Conference on Cluster Computing (CLUSTER'01), 2001.*

* cited by examiner

*Primary Examiner*—Meng-Al T. An
*Assistant Examiner*—Jason Mitchell
(74) *Attorney, Agent, or Firm*—Hickman Palermo Truong & Becker LLP

(57) ABSTRACT

In a multi-node computer system, a software version management system is described having a version manager for ensuring that cluster nodes running completely incompatible software are unable to communicate with each other. The version manager provides a mechanism for determining when nodes in the cluster are running incompatible software and providing a way for determining the exact version of software that each node must run. The version manager provides support for rolling upgrades to enable the version management software to ensure the chosen version of software that runs the cluster stays constant even though the software installed on individual nodes is changing.

28 Claims, 9 Drawing Sheets

SYSTEM AND METHOD FOR MANAGING SOFTWARE VERSION UPGRADES IN A NETWORKED COMPUTER SYSTEM

FIELD OF THE INVENTION

The present claimed invention relates generally to the field of multi-node networked computer systems. More particularly, embodiments of the present claimed invention relate to a method and system for managing software version information that comprise a networked computer system.

BACKGROUND ART

When information technology professionals design systems, they face some very tough challenges. Users are no longer naive, and have high expectations about the reliability, availability and serviceability of the systems they use. Increasing competitive pressure on enterprises have forced other attitudes to change as well. Information is fast becoming many businesses' greatest asset, making the need to guarantee higher degrees of availability more important than ever.

Traditionally, the obstacle to accomplishing this has been cost. However, enterprises are finding ways of reducing the cost of ownership and operation of computer systems within their business environments. One of such approaches is the use of networked computers. Network computers enable enterprises to provide shared resources to multiple users while ensuring that system downtime is substantially reduced.

Sun Confidential

In a networked computing environment, a group of computer systems (or nodes) may be used to form a cluster. Clusters are characterized by multiple systems, or nodes, that work together as a single entity to cooperatively provide applications, system resources, and data to he user community. Each node can itself be a symmetric multiprocessing system (SMP) containing multiple CPUs.

Clusters provide increased performance and availability not available in single SMP systems. Performance is scalable across nodes, offering a high-end growth path: additional nodes, processors, memory and storage can be added as they are required. Clusters also provide increased availability: should one node fail, other cluster nodes can continue to provide data services, and the failed node's workload can be spread across the remaining members.

Clustered architectures are uniquely suited for the provision of highly available services. In a properly designed arrangement, they feature redundant paths between all systems, between all disk sub-systems and to all external networks. No single point of failure—hardware, software or network—can bring a cluster down. Fully integrated fault management software in the cluster detects failures and manages the recovery process automatically.

FIG. 1 is a simplified exemplary illustration of a prior art networked (cluster) computer system. The cluster 100 of FIG. 1 integrates redundant server systems, or nodes 110 A-D to ensure high availability and scalability. The cluster 100 includes redundant storage disks 120 A-C which are generally mirrored to permit uninterrupted operation in the event that one of them fails.

Redundant connections are provided to the disk systems 120 A-C so that data is not isolated in the event of a node, controller or cable failure. Redundant connections between nodes are also provided via private interconnects 130 A and 130 B to enable the nodes stay synchronized and work together as a cluster. All cluster nodes are connected to one or more public networks such as a publicly switched telephone network (PSTN) 140 enabling clients on multiple networks to access data. Because most clusters are intended to be managed as a single computing resource, a cluster management software may provide a unified control of the cluster.

The software simplifies administration by treating all servers in the cluster as a single entity. FIG. 2 is a exemplary block diagram illustration of the prior art software architecture 200 of the cluster 100 in FIG. 1. Although each of the nodes in cluster 100 may have its own independent software architecture, the cluster 100 is typically designed with a unified software architecture to support both database applications and other highly available data services. The software architecture in FIG. 2 includes a cluster framework layer 210, data services layer 220, application interface layer 230, operating systems layer 240 and a platform specific services layer 250.

The cluster framework layer 210 is at the heart of the overall software architecture with multiple data services and the application program interface layer 230 enables developers to integrate additional customer applications into the cluster architecture and make them available. The data services layer 220 and the cluster framework layer 210 are based on an underlying operating system layer 240 that enables and ensures programming interfaces and full support for multiprocessing and multi-threading application capabilities. Although the cluster software architecture 200 provides a unified architecture of support across nodes in the cluster, each cluster node may have different versions of software at any given time. In order to provide the services in the cluster 100, some of the protocols that are required need to be distributed—that is the software is essentially running on multiple nodes—in the cluster 100 simultaneously and not mere in one place at one time. For example, the cluster membership monitor uses a distributed protocol to determine which nodes are part of the cluster 100 and which nodes are not at any given time.

And as the versions of distributed protocols change over time, the incompatibility of software versions among nodes impeded communication between the nodes and hampers the ability of the cluster to provide service availability to users. Furthermore, the prior system illustrated in FIG. 2 lacks the ability to automatically and simultaneously upgrade software versions across the cluster. Consequently, software upgrades in the cluster can be very cumbersome, time consuming and costly impacting system and cluster resource availability to end users.

Thus, there is a need for a system and method for automatically managing software version changes in a cluster system to ensure system availability and to reduce the cost associated with system upgrades. A solution that provides a self consistency and avoids complex or error-prone version management mechanisms is also needed.

SUMMARY OF INVENTION

Accordingly, there is provided a multi-node computer system having a software version management system and method that allows an automatic and simultaneous management of software version changes in the multi-nodes. The version manager also allows newer versions of components in the cluster to cooperate with older versions in a single running cluster.

What is described herein is a software version management system for dynamically upgrading software version changes across multiple nodes in a cluster computer system. The version management system provides a mechanism for managing software version changes across multiple nodes in order to ensure that clusters running completely incompatible software do not attempt to communicate in order to minimize system down-time in the cluster computer system. A version manager provides an API that allows components to inter-operate with their older counterparts on other nodes using a feature called "versioned protocol". Versioned protocols are uniquely named entities managed by the version manager and specified through files installed at the same time software changes are installed on a node.

Embodiments of the present invention also include a mechanism for the version manager to determine when nodes are compatible. The version manger determines exactly what version of a protocol or distributed system should be run by each node in the cluster. Versions are determined for three different types of protocols. In another approach, the version manager implements a node-pair version management scheme for protocols that involve communication between two nodes, where a separate version is maintained for each individual pair of nodes in the cluster. In another approach, the version manager implements a cluster mode scheme for protocols that involve maintaining a single version of the software being upgrades for all nodes in the cluster regardless of how many nodes exist. In one approach, a per-node determination for protocols that capture information unique to a node but does not impact communication directly. These are used in conjunction with the other two types through a dependency system. The version manager further has a notion of bootstrap versions that are negotiated earlier during a boot-up process in the cluster formation process than standard versions.

Embodiments of the present invention also include dependency implementation logic that allows the version manager to establish dependencies between versions of different subsystems for cases where those subsystems are dependent on one another.

Embodiments of the present invention further include rolling upgrade support logic that enables the version manager to support rolling upgrades of software across the cluster. This support applies to cluster-mode versions for both bootstrap and non-bootstrap. The version manager ensures that each chosen cluster-mode version stays constant even when the software installed on individual nodes is changing.

Embodiments of the version manager also include file specification logic that contain specifications of what versions of the versioned protocol could potentially run on a specific node, as well as information on how a versioned protocol should be managed. The version manager creates an abstraction of the versions a component can support and picks the appropriate "running version" of that abstraction based on the specification files on each node and a set of rules.

The state of the abstraction and the versioned protocol can be examined by component that created the abstraction.

Embodiments of the present invention further include query interface logic that allows each subsystem to determine the versions picked by the version manager to extract the current version information of an associated versioned protocol and choose the appropriate version level to run. The subsystem then uses the running version of the versioned protocol to make decisions about what version of its own software to use at a given time.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to manage software version upgrades in a multi-node computer network system. In accordance with an aspect of the invention, a system for dynamically determining software versions running on nodes clustered in a networked computer system and upgrading nodes in the network computer system is described. In a preferred embodiment of the present invention, a subsystem provides a computer operating system with information on various versions of software running on nodes in a multi-node computing environment in order to determine which nodes may or may not be allowed to communicate in the cluster.

Figure 1:
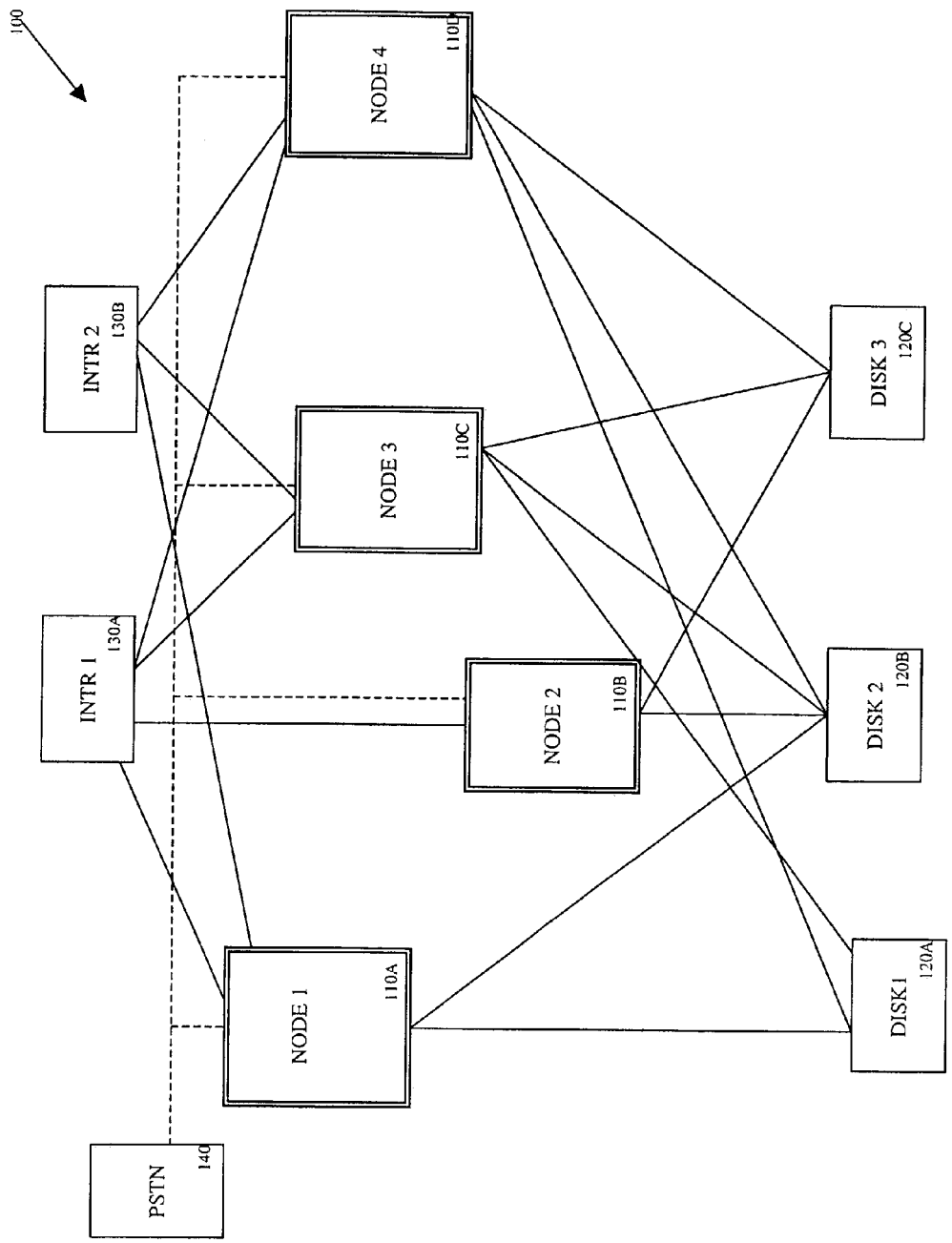
FIG. 1 is a block diagram of a prior art multi-node computer system.
Figure 2:
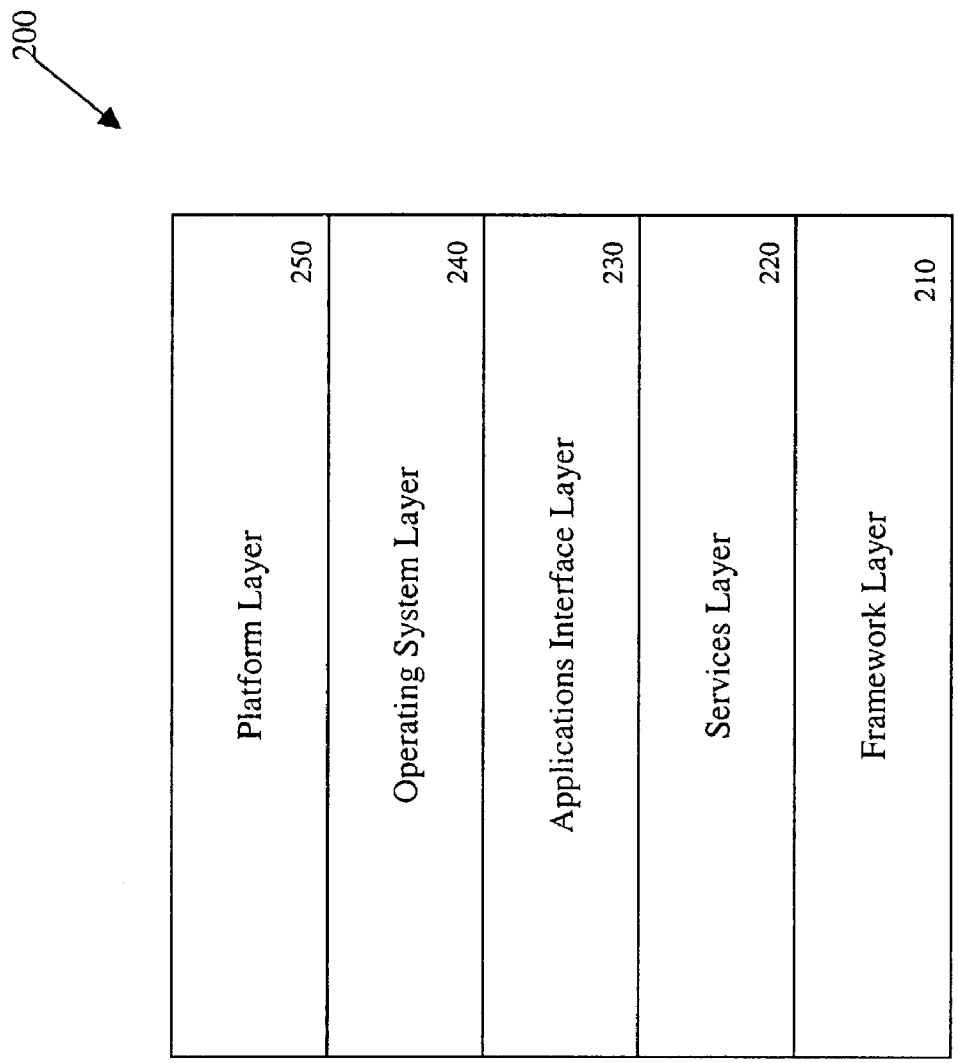
FIG. 2 is a block diagram of a prior art software architecture of the multi-node computer system in FIG. 1.
Figure 3A:
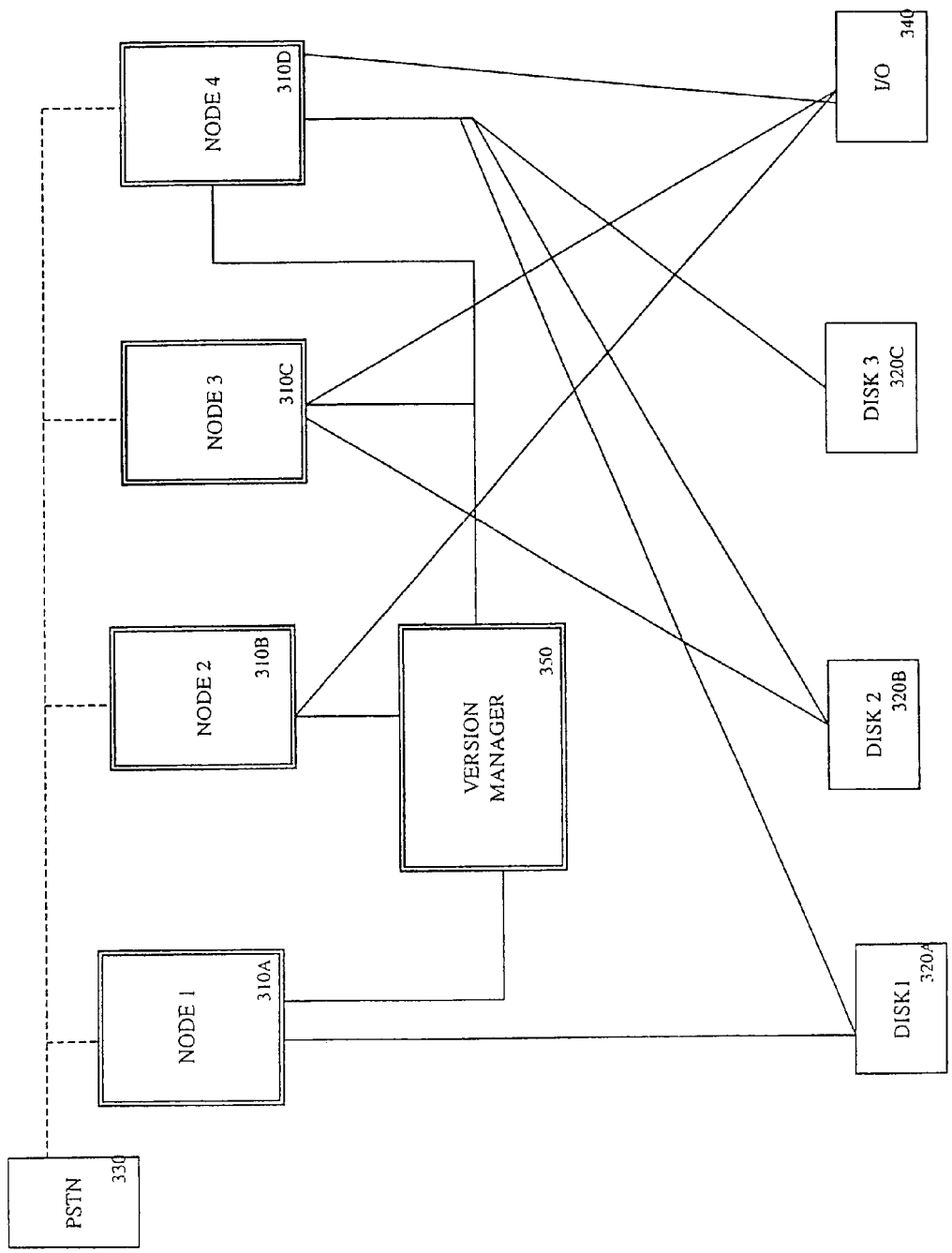
FIG. 3A is block diagram illustration of one embodiment of a network computer system in accordance to the present invention.

FIG. 3A is a block diagram illustration of an exemplary embodiment of a multi-node computer system 300 of one embodiment of the present invention. The multi-node computer system 300 illustrated in FIG. 3A comprises nodes 310A-310D, disks 320 A-C and input and output (I/O) devices 340. It is important to note that the cluster system depicted in FIG. 3A is merely exemplary and that the present invention may be utilized in much larger or smaller clusters or networked computer systems. Nodes 310A-D may be communicatively coupled (e.g., via wire-line and/or wirelessly) or otherwise networked with a PSTN 330.

In one embodiment of the present invention, each of nodes 310A-310D may include one or more CPUs each of which is running an instance of an operating system. Using the nodes, the present invention enables nodes to boot up in compatible software versions common to the cluster 300. In one embodiment of the present invention, nodes 310A-310D are interconnected as peer nodes within cluster 300 using multiple redundant links to ensure that failure in a single connection does not affect the rest of the links.

The nodes may cooperate to jointly provide highly available services to users on the cluster. For example, all nodes may cooperate to ensure that an application program or service runs on exactly one node, so that if the node on which it is running fails, the application will be restarted on a different node. Each node also has a cluster membership monitor (CMM) that is used to monitor cluster resources by providing status information to a cluster management console. When the CMM detects a failure, it invokes a configuration protocol that configures the failed element at the node or disk-subsystem level and creates a new logical cluster. The nodes also include an underlying operating system that provides flexibility, availability and compatibility to support enterprise-wide computing. In one embodiment of the present invention, the operating system includes a kernel.

In one embodiment of the present invention, the version manager 350 is coupled to the kernel of the operating system. The kernel is responsible for controlling system resources in system 300 and scheduling access requests by application programs to memory in the nodes. The version manager 350 provides an application programming interface (API) that allows components to inter-operate with their older counterparts on other nodes in the cluster 300 using a new feature called a "versioned protocol". A versioned protocol is an abstract representation of the version of the protocol being used in a cluster. In order for a versioned protocol to be of any use, the subsystem implementing the protocol will have to query the version manager to retrieve the running version and then choose the appropriate corresponding protocol.

Versioned protocols are uniquely named entities managed by the version manager 350 and specified through files installed at the same time software changes are installed. Each of these files contains a specification of what versions of the protocol can potentially be run on that node, as well as information on how the versioned protocol should be managed. The version manager 350 then compares the specification files on each node and determines what version of the versioned protocol should be active at any given time.

The software component of a node in the cluster 300 can query the version manager 350 to extract the current version of software and its associated versioned protocol and choose the appropriate version level to run. In one embodiment of the present invention, the version manager 350 allows the creation of an abstraction of the versions (of protocol, or an interface, etc.) a component in the cluster can support. The version manager 350 then picks an appropriate "running version" of that abstraction based on a specification file on each node and a set of rule. The state of this abstraction, the versioned protocol, can then be examined by the appropriate component that created it. The component can then in turn use the running version of the versioned protocol to make decisions about what versions of its own software to use at any given time.

Because the components on every node are doing the same thing, the consistency (i.e., the same version is picked between pairs of nodes, or on every node in the cluster) of the management of the versioned protocol translates into a consistency in the actions of the component. The version manager 350 provides a mechanism for ensuring that nodes having incompatible software versions do not communicate with each other in order to prevent failures in the cluster 300. When the version manager determines that nodes are compatible, the version manager 350 determines exactly what version software of a protocol or distributed system should be run by each node.

In one embodiment of the present invention, the versioned protocols running on each node are determined for three different "flavors" of protocols: per-node protocol for protocols that run somewhat independently on each node in the cluster; node-pair protocol for protocols that involve communication between two nodes and can be versioned independently for each pair of nodes; and cluster protocol for protocols that are versioned cluster-wide. The version manager 350 also has a notion of bootstrap versions which are negotiated earlier in the cluster formation process than standard versions to enable nodes communicate at low level boot processes.

In one embodiment of the present invention, the version manager 350 also provides a mechanism for establishing dependencies between versions of different subsystems for cases where the subsystems are dependent on one another. The version manager 350 further provides support for enabling rolling upgrades to nodes in the cluster. This support applies to cluster-mode version upgrades. In one embodiment of the present invention, the version manager 350 ensures that each chosen cluster-mode version stays constant even when the software installed on individual node is changing, if necessary, to prevent incompatible nodes from entering the cluster.

Figure 3B:
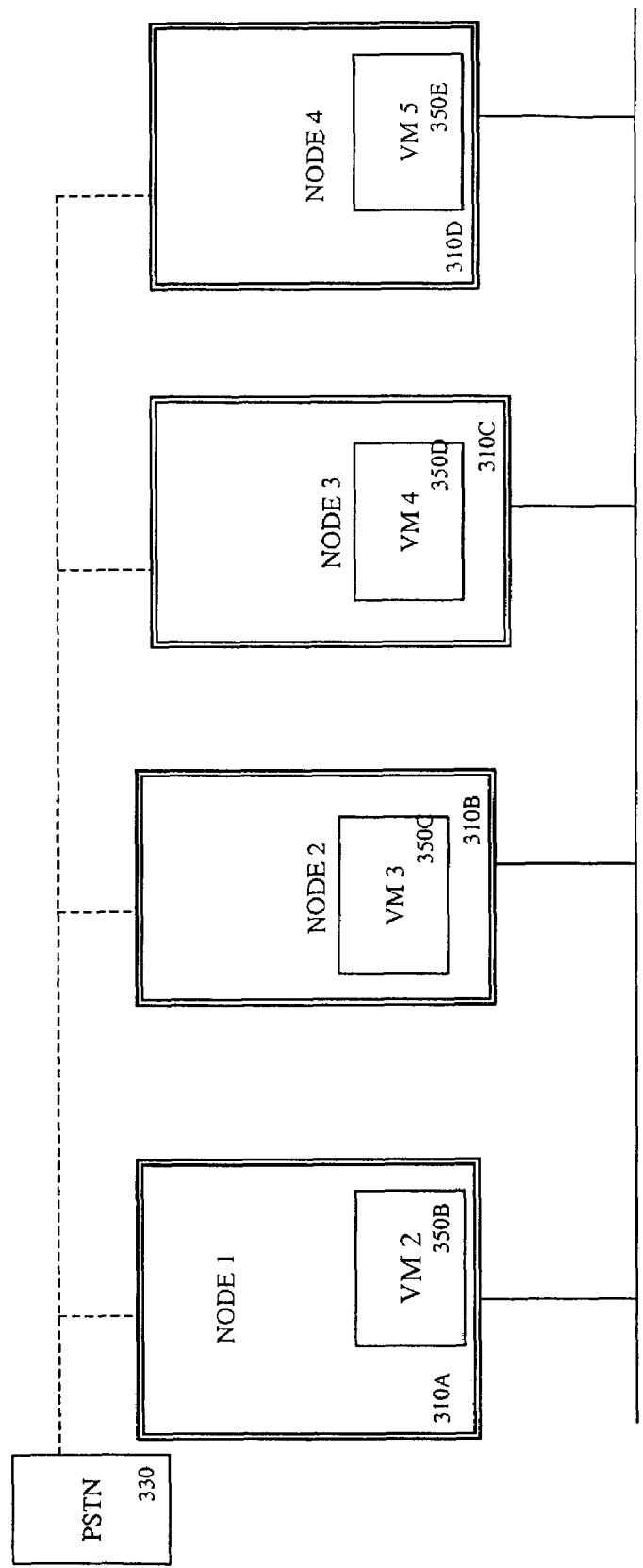
FIG. 3B is a block diagram of one embodiment of a multi-node network with each node having a version manager in accordance to the present invention.

In one embodiment of the present invention, the version manager 350 implements a query interface that allows each subsystem to determine the versions picked by the version manager 350 and a callback system that allows the version manager 350 to communicate with each subsystem during a "commit" operation when versions are upgraded. Although, the version manager 350 depicted in FIG. 3A is shown in the context of cluster 200, an embodiment of the present invention may implement a version manager, depicted respectively as version manager 350B-E in each of nodes 310A-310D, to enable each node in the cluster 350, as illustrated in FIG. 3B, to communicate with others on the cluster to determine the version software each node is running. In one embodiment of the present invention, one of nodes 310A-310D may be designated as a coordinator node to coordinate software version determinations during rolling upgrades in the cluster 350.

Figure 4:
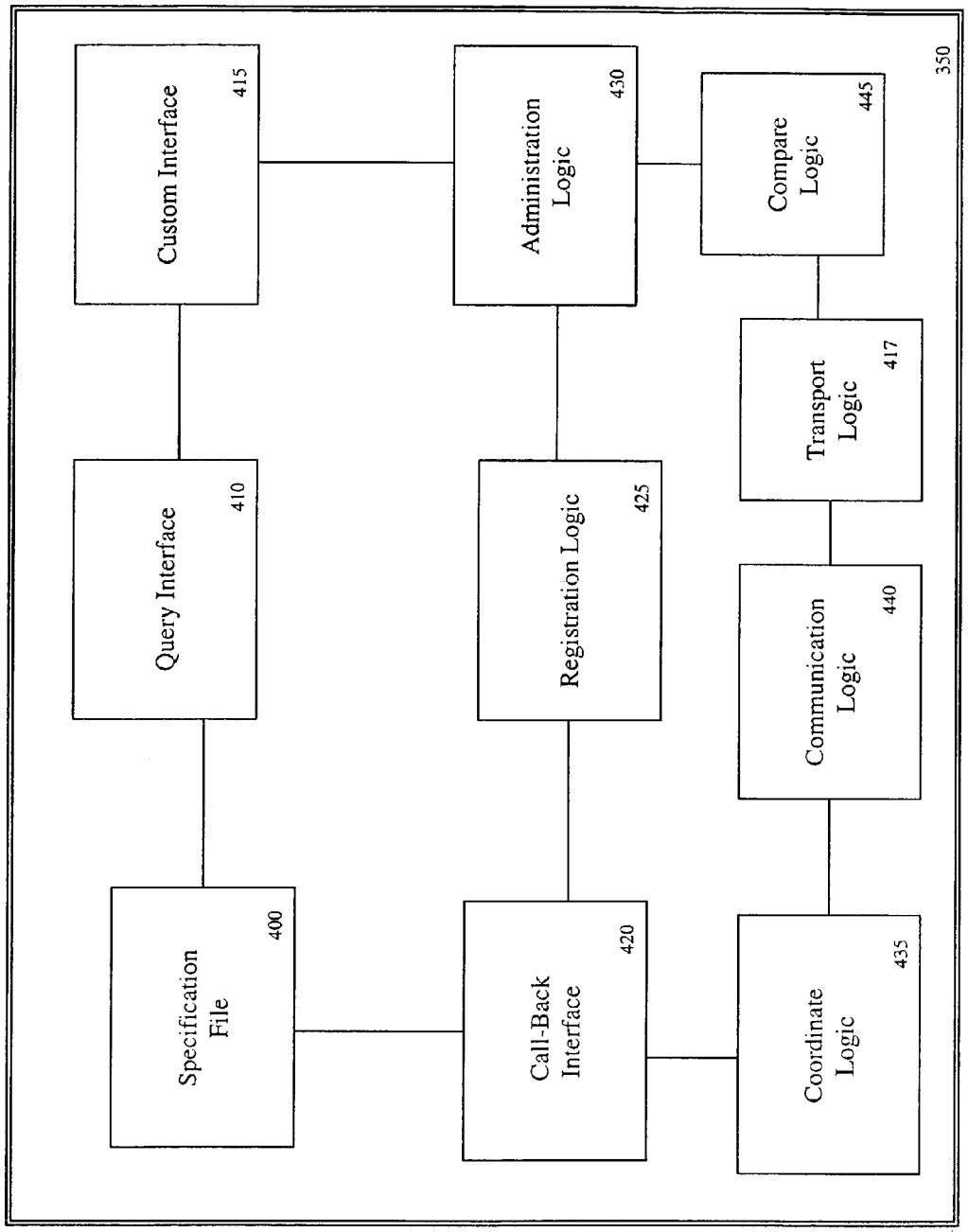
FIG. 4 is a block diagram illustration of one embodiment of the internal architecture of the version manager of one embodiment of the present invention.

FIG. 4 is a block diagram of one embodiment of the internal architecture of the version manager 350 of the present invention. As shown in FIG. 4, the version manager 350 comprises specification file 400, query interface 410, custom interface 415, call-back interface 420, registration logic 425, administration logic 430, coordinate logic 435, communication logic 440 and compare logic 445.

Components in a node are able to create "a versioned protocol". Each versioned protocol is identified by a unique name and specified in a file that is installed in a directory in the cluster 300. The file can be updated through the same processes that software on a node is updated. The specification file 400 includes a set of versions the versioned protocol may potentially support on a particular node, which will correspond to the versions the associated component supports. In one embodiment of the specification file 400, support of versioned of a versioned protocol may depend on specific versions of a different versioned protocol. These dependencies may be used to model the actual dependencies between components when necessary.

In one embodiment of the present invention, the specification file 400 sets the mode for each versioned protocol created and the version manager 350 maintains a versioned protocol in one of three basic modes:

a) if a versioned protocol specifies "Node" mode, the version manager 350 manages the "running version" of that versioned protocol separately on each node in the cluster, so each node will have its own running version;

b) if a versioned protocol specifies "Node-pair" mode, the version manager 350 maintains a running version of the versioned protocol for each pair of nodes in the cluster, so if there are N nodes in the cluster, there will be N(N−1)/2 running versions of the versioned protocol; and c) if a versioned protocol specifies "Cluster" mode, the version manager 350 maintains a single running version of the versioned protocol for the entire cluster that is guaranteed to be the same on every node.

In one embodiment of the present invention, the specification file 400 further comprises version dependency information of versioned protocols defined in the specification file 400. Support of a given version of a versioned protocol may be tied to the support of one or more versions of a different versioned protocol through dependencies. For example, if version 1.1 of a versioned protocol "X" has no dependency, but version 1.2 of "X" requires version 1.1 of "Y", version 1.2 of "X" will only be chosen as running version "X" if the running version of "Y" is 1.1. Dependencies may be considered entirely local to a particular node they are specified on, so it may be possible for version 1.2 of "X" to depend on 1.1 of "Y" on one node, and have 1.2 of "X" lack any dependencies on a different node. In one embodiment, the versioned protocols may also be able to influence the choice of running versions with constraints of the versioned protocol specification on a local node by specifying the versioned protocol as having "custom" support. Like dependencies, custom support is entirely local to a node, so a versioned protocol on one node may be using custom interface to help pick the running version, while a different node might have the version manager 350 pick them directly.

The version manager 350 provides query interface 410 to allow the components that specified a versioned protocol to determine the current running version(s) associated with it, as well as other information. The query interface 410 also provides detailed information about the versions supported by versioned protocols on each node in the cluster so the service managing a custom versioned protocol can make informed decisions. In one embodiment of the present invention, the running versions of the versioned protocols are picked up when the cluster 300 first achieves a quorum and then updated at the point when upgrades are committed.

The custom interface 415 allows components to influence the choice of running versions based on dynamic information provided by a node. In one embodiment of the present invention, the custom interface 415 allows versioned protocols to be used to capture runtime conditions such as the size of the operating system's kernel address space, etc. In one embodiment of the present invention, the custom interface 415 may also allow node components prevent new nodes from joining the cluster 300 based on dynamic information provided by the version manager 350.

The call-back interface 420 informs components of various state changes in the versioned protocol and prompt components that use the custom interface 415 to implement the necessary steps when input is needed. The callback interface 420 also informs systems with custom versioned protocols that a version-related event has taken place or that inputs (such as a potential new running version) is needed. In one embodiment of the present invention, components may register for an "upgrade callback" with the registration logic 425 when running versions of the versioned protocol changes.

Components may also be able to request that certain conditions be true when a callback is made. These conditions may include: the callbacks for a supplied list of dependent components have started; the callbacks for a supplied list of dependent components have completed; and a supplied list of replicated services is in the quiesced state.

Still referring to FIG. 4, the administration logic 430 parses the specification files 400 to keep track of running versions on each node in the cluster. The coordinate logic 435 comprises information on software upgrades in each node on the cluster. The coordinate logic calculates all the version information on nodes in the cluster. The coordinate logic 435 also enables each node in the cluster to be designated as the coordinator to monitor version information on other nodes in the cluster. The communication logic manages communication between the administration logic 430.

In one embodiment of the present invention, the coordinate logic 435 allows each node in the cluster to contact other nodes to retrieve potential versions of each cluster and node-pair versioned protocols. If any of those versioned protocols are using custom mode, the facilities managing them will retrieve a callback requesting the subset of the versions which can be supported on the node. When potential versions are provided, any relevant dependency information from that node is also sent to the coordinator. The coordinator then evaluates all possible combinations of versions and ranks them first by the number of nodes that have fully defined and valid running versions for every versioned protocol and then by the desirability of the versions picked.

Compare logic 440 enables the version manager 350 compare specification files on nodes in the cluster to determine what version of a versioned protocol should be active in a node at any given time. The compare logic 440 is implemented in connection with the query logic 410 to extract the current version of software in a node to determine the appropriate version level to run.

Figure 5:
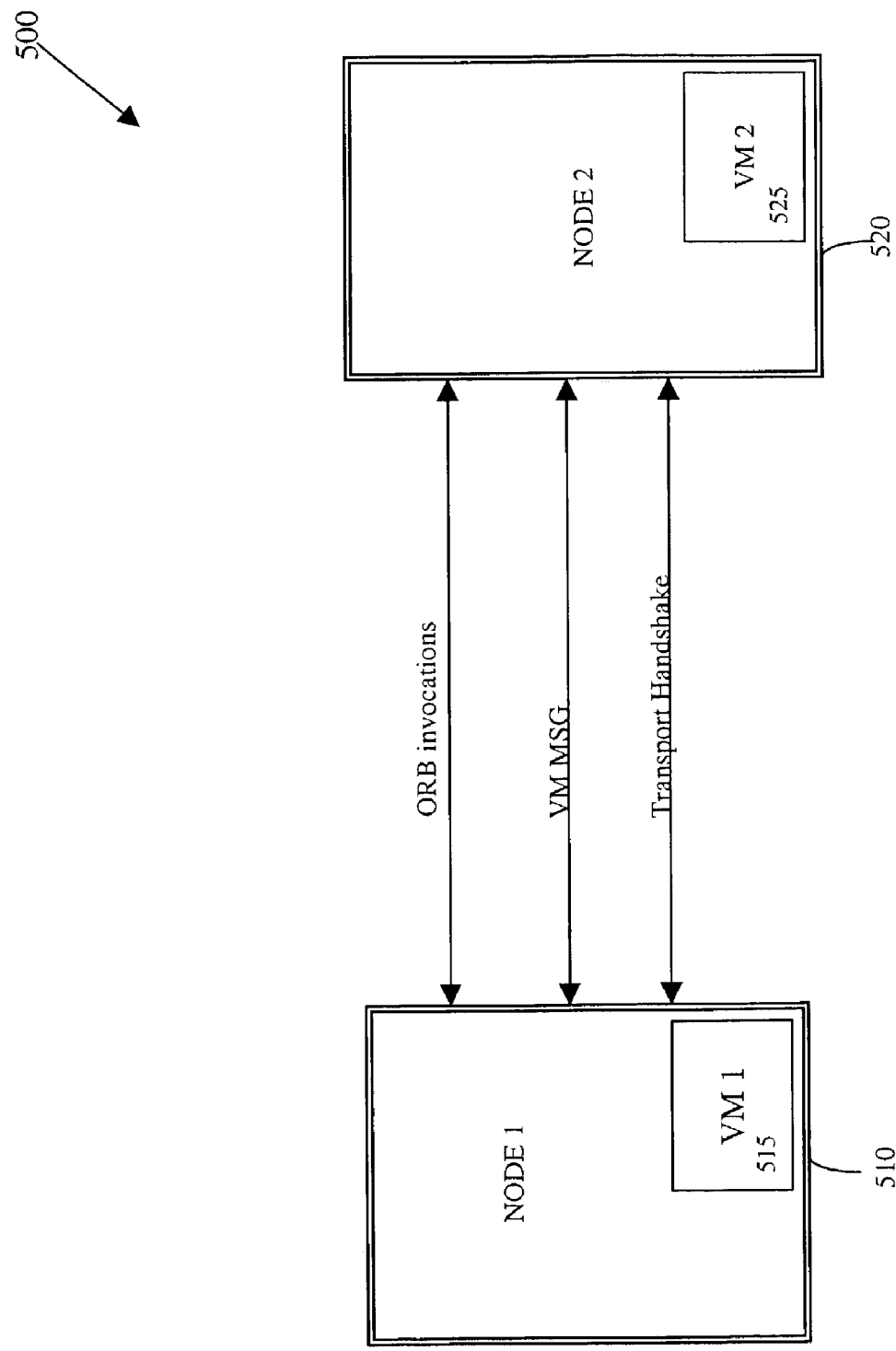
FIG. 5 is a block diagram illustration of an embodiment of initialization and communication between the version manager in a node-pair in a cluster of FIG. 3.

FIG. 5 is a simplified block diagram of an exemplary illustration of how two nodes initialize and communicate during a software version check or upgrade in the cluster 500 of one embodiment of environment of the present invention. As shown in FIG. 5, each of the nodes 510-520 comprise a version managers 515 and 525 respectively. Execution of the version managers 515 and 525 may be broken down into a number of distinct stages: (a) initialization, (b) node-pair mode bootstrapping, (c) cluster mode bootstrapping, (d) selection of running versions and (e) upgrade commit.

Initialization

During an initialization, the versioned protocol specification files in each of nodes 510-520 are parsed and turned into an internal data structure in each node. Because the version manager in each node is not communicating with the other, this stage of the initialization process is local to each node. When the last file has been parsed, the versioned protocols are split into four groups: node bootstrap; node-pair bootstrap; cluster bootstrap and all others.

Next, a custom interface is called on each bootstrap version protocol that lists "custom" as one of its attributes. Nodes using the custom flags are responsible for registering an object supporting custom versioned protocol CORBA IDL interface in the local name-server bound to the named list in the node's specification file 400. The object is called by sending in a list of all supportable versions (from the file) and the component is pass back the subset of versions it is able to support.

When every custom bootstrap versioned protocol has been called, the versions of node mode bootstrap versioned protocols is set to the highest possible. The last phase of the initialization process prepares a transport 417 bootstrap version string. In one embodiment of the present invention, the supportable versions of every node-pair mode bootstrap versioned protocol is encoded in this string.

Node-Pair Mode

During the node-pair mode bootstrap phase, the version managers establish the lowest level protocols the node pair 510 and 520 will use to communicate. Examples of such protocols might include low-level transport headers, object request broker (ORB) message format, and duplicate message detection systems. Each time the transport receives a new connection attempt from a different node, the bootstrap version strings will be traded. The transport handshake is asymmetric (based on node-id) but the version decisions can be made symmetrically.

Each node will contact the other, sending a bootstrap version string, the node-id (which may be implicit based on source address). The transport interface 417 then passes this information to either of version manager 515 and 525. If a bootstrap string has already been accepted, the version manager simply returns "true" to the calling transport interface 417. If a string has never been received for that particular node, the version manager unpacks the string and compares its own bootstrap versions. For every node-pair versioned protocol in the strings, the highest version common to both is chosen. If the local node is unaware of the existence of a versioned protocol that is passed from a remote node, the local node assumes it is compatible with the initial version (e.g., 1.0) of that versioned protocol, so if the initial version is listed in the relevant set of versions, it becomes the implicit common version.

If any versioned protocol has no common version, the version manager returns "false" letting the transport interface 417 know that it should reject the connection. Otherwise, it returns "true" and the transport interface 417 continues initiating the connection. At the end of this stage, running versions are established for the node-pair mode bootstrap protocols between the two nodes 510 and 520. Components that need to cooperate between the nodes 510 and 520 can query their local version managers 515 and 525 respectively for the version of their versioned protocols and then structure their communication accordingly. The only communication that can't be versioned using this facility is the transport 417 handshake itself, for which outside information may be required if the protocol is changed significantly.

Cluster Mode

The cluster mode envisages communication between two or more nodes in a cluster. During the cluster mode bootstrap stage, the version manager establishes the lowest level distributed protocols in the cluster. These may include the reference counting algorithm and versions of the RMM and replica manager. This stage takes place in the middle of the CMM synchronization implementation which separates into two steps. The CMM synchronization system is a low-level in the underlying operating system's cluster that allows (with certain limitations) algorithms to be run in synchronized steps on each node in the cluster. The steps are ordered, and there is a guarantee that very node will say it is done with step 1 before any node start to run step 2, etc. In the first synchronization step, the components involved in node-to-node communication are initialized.

Next, each of the version managers 515 and 525 sends each other the list of cluster mode bootstrap versioned protocols specified on the respective nodes along with each version of each versioned protocol it is compatible with. These messages are sent using facilities versioned by the node-pair bootstrap versioned protocols. When a node has sent its information to every node, it will wait until it has received the messages from every other node in the cluster. When all messages have been received, each node calculates running versions for the versioned protocol in parallel using a deterministic algorithm as follows:

a) If a valid running version can be picked for every cluster mode bootstrap versioned protocol, the highest possible versions are picked. The version picked must be listed as being supported by every node.

b) If at least one versioned protocol does not have a valid version on all nodes, the version manager retries the calculation with combinations of nodes removed. The nodes are removed in a deterministic order based on the number of quorum votes they posses and using node-id to break ties.

If a pattern of nodes that preserves quorum can be obtained, the nodes that form the cluster set their running versions to those values at the start of the next step, and any excluded nodes will take themselves out of the cluster. This algorithm works differently if new nodes are joining an existing cluster. In which case the cluster will already have established running versions, and new nodes will either be supported by joining or will be remove from the cluster. Communication between nodes in this case is also limited as much as possible. After the current running version of the versioned protocol in the cluster has been upgraded, nodes joining the cluster or existing in the cluster that wish to upgrade the versioned protocol, individually commit to an upgrade to the upgraded versioned protocol.

Upgrade Commit

When committing upgrades to nodes in a cluster, two basic stages comprising choosing new running versions and initiating upgrade callbacks are implemented. In choosing new running versions, the version manager handles node-pair mode bootstrap versioned protocols at the transport handshake level. Node-pair mode vp running versions are picked only when new connections are established, and therefore are not upgraded afterwards. In one embodiment of the present invention, only cluster-mode vps are upgraded. Also in the version manger, cluster-mode running versions are picked once when the cluster first forms (already described) and then changed only when commits occur. This give the administrator control over when the upgrade of the versions takes place. The local version manager to which the commit function is delivered makes a note indicating there will be an upgrade and then triggers a cluster membership monitor (CMM) reconfiguration.

In the first step of CMM reconfiguration, the version manager triggers commit by sending along with any necessary information, a message to each other node indicating a commit is in progress. However, the information needed by other nodes may change over time. For example, on a first reconfiguration, each node only needs to know what versions the other nodes can support starting essentially from nothing. On subsequent reconfigurations, each node needs to know what versions can be upgraded to from the existing running versions.

In one embodiment of the present invention, at least one running version for every versioned protocol is compatible on all nodes that are in the cluster. In another embodiment of the present invention, a coordinator node determines if higher running versions can be chosen for any non-bootstrap mode versioned protocols and picks those higher versions if possible.

Figure 6:
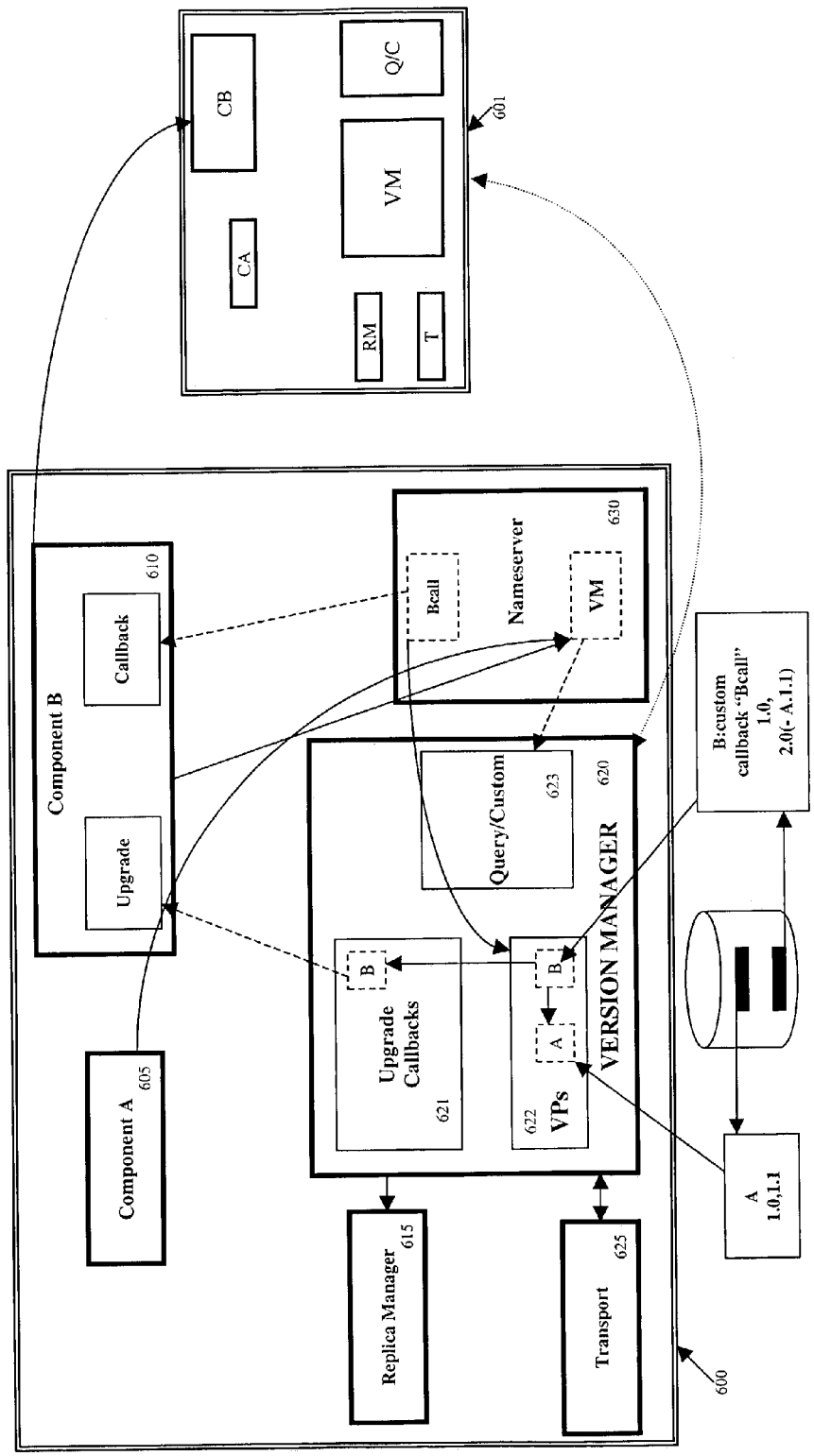
FIG. 6 is a block diagram illustration of component interactions between nodes in a cluster of one embodiment of the present invention.

FIG. 6 is a block diagram illustration of an exemplary embodiment of component interactions between nodes in a cluster of one embodiment of the present invention. As shown in FIG. 6, the cluster comprises nodes 600 and 601. Each of nodes 600 and 601 comprises component A (CA) 605, component B (CB) 610, replica manager (RM) 615, version manager (VM) 620, transport module 625 and local name-server 630. As shown in FIG. 6, each of the components of nodes 600 and 601 are replicated for other nodes on the cluster. In the example shown in FIG. 6, VM 620 comprises upgrade callback module 621, versioned protocol file 622 and query/custom interface 623.

The versioned protocol file 622 comprise specified files "A" and "B" which define the version of software that node 600 is running. In the example in FIG. 6, versioned protocol "A" has two versions consisting of 1.0, and 1.1 installed in node 600. Similarly, protocol "B" has version 2.0 installed. In the case of version protocol "B" a dependent version 1.1 of version protocol "A" is also installed in node 600. Each component in nodes 600 communicates with corresponding components in node 601 and vice versa.

The upgrade callbacks 621 handles changes in the running version of the versioned protocol that (in this case from "A" 1.1 to "B" 2.0) prompts an upgrade callback by the query/custom interface 623. The value returned by the query interface 623 can be cached by the caller (e.g., CB 610), if the caller also registers a callback to invalidate the cached value. Whenever the running version of a versioned protocol changes, upgrade callbacks are issued to any component that has requested that upgrade. The upgrade callback is not directly tied to the custom interface 623 callbacks and any number of components can register to callback associated versioned protocols. Each callback specifies when the running version of the relevant versioned protocol is upgraded.

CA 605 and CB 610, each utilize the upgrade callbacks when running versions of a versioned protocol changes. Each of CA 605 and CB 610 may also be able to request that certain conditions be true when a callback is made. Possible conditions may include: that the callbacks for a supplied list of dependent components have started; that the callbacks for a supplied list of dependent components have completed and that a supplied list of replicated services is in a quiesced state. Components can use these upgrade callbacks to upgrade their own versioned level to correspond to the running version of their associated versioned protocol.

Each version manager in nodes 600 and 601 communicates with each other and other nodes in the cluster via transport module 625. In one embodiment of the present invention, transport module 625 provides the lowest level of communication established between nodes in the cluster in a node-pair mode. In one embodiment of the present invention, the transport module 625 provides a asymmetric handshake to allow connection between a pair of nodes to initiate a bootstrap boot-up operation.

Figure 7:
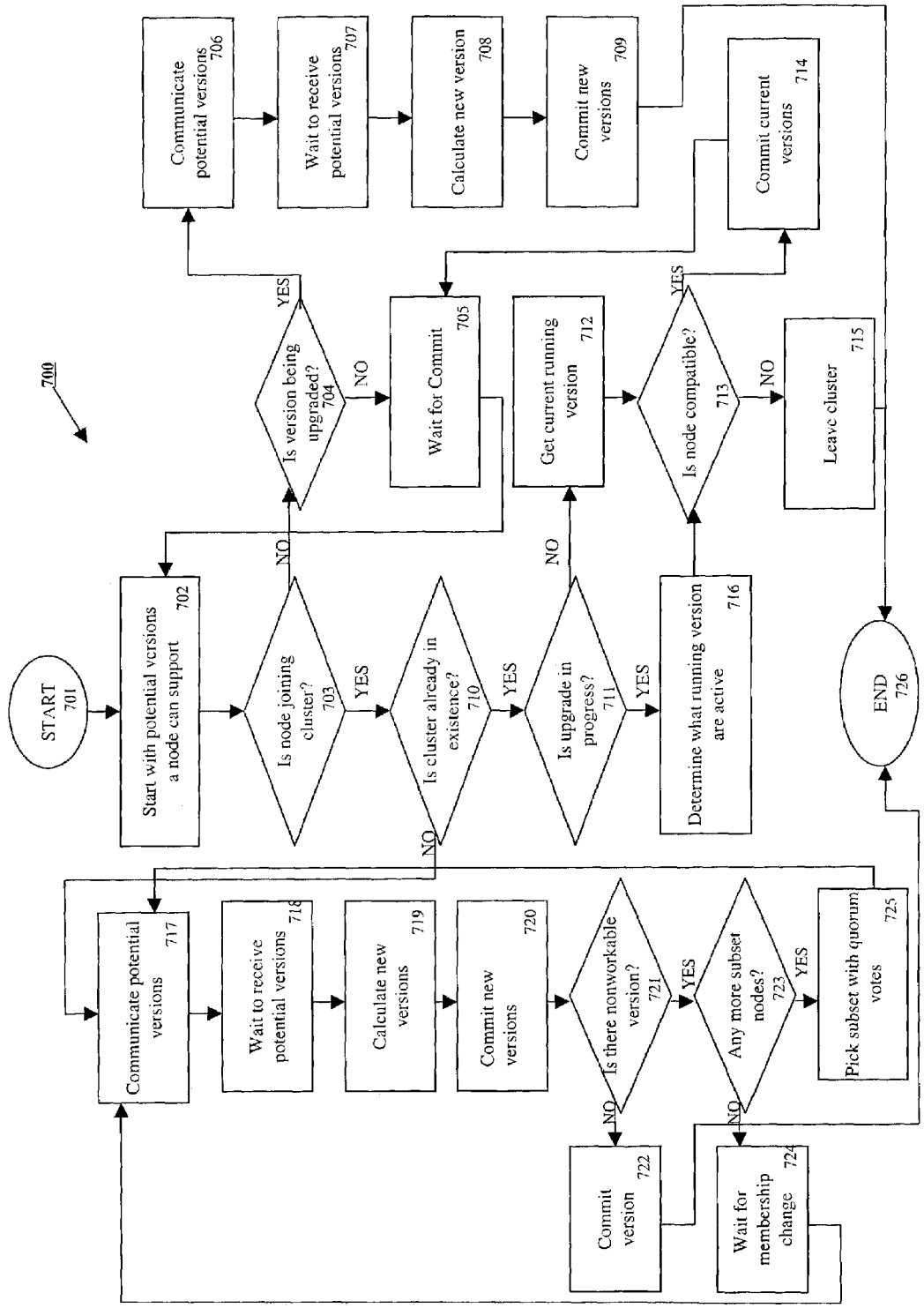
FIG. 7 is a flow diagram illustrating one embodiment of a versioned protocol selection in a cluster mode environment in one embodiment of the present invention.

FIG. 7, is a flow diagram illustration for an example process 700 of one embodiment of a versioned protocol selection in a cluster of one embodiment of the present invention. As illustrated in FIG. 7, a running version of versioned protocols in nodes in a cluster of the present invention is chosen by a node attempting to join the cluster at step 702. Prior to determining whether a node could join the cluster or not, potential versions of the versioned protocol that the node may support is designated also at step 702.

If the node is not joining an existing cluster at step 703, the version manager 350 checks to determine whether the current running version of the versioned protocol in the node is being upgraded. If the current running version of the versioned protocol is being upgraded at step 704, potential versions of the versioned protocol is provided to the node at step 706. If not, the version manager 350 waits for a commit at 705.

At step 707, the joining node waits to receive potential valid running versions of the versioned protocol and at step 708, the version manager 350 calculates the new running version of the versioned protocol for the joining node. At step 709, the new version is committed to the joining node to end the upgrade session.

If the joining node is attempting to join the cluster at step 703, the version manager determines whether a cluster already exits for the node to join at step 710. If a cluster already exists for the node to join, the version manager 350 determines whether an upgrade is in progress in the cluster at step 711. If an upgrade is not in progress, the version manager 350 secures the current running version of the versioned protocol and determines whether the current running version of the versioned protocol is compatible with the joining node at step 713. If not, at 712 the version manager gets the current running version.

If there is compatibility between the joining node and the current running version of the versioned protocol, the version manager 350 commits the joining node to the current running version of the versioned protocol in the cluster at step 714 and waits to upgrade the joining node at the commit stage. If the joining node is incompatible with the current running version of the versioned protocol, the node is unable to join the cluster and terminates at step 715.

If an upgrade is not in progress while the joining node attempts to join the cluster, the version manager 350 determine what running version of the versioned protocol are active on nodes in the cluster at step 716 and determines whether the new node is compatible with the current running version in the cluster again at step 713.

If while attempting to join a cluster the version manager 350 to determines that the cluster does not exist, potential versions of available versioned protocols are provided to the node at step 717 and at step 718 the node waits to receive the potential versions. At step 719, the version manager 350 calculates new version of available version protocols and commits the node to the new version at step 720.

At step 721, the version manager 350 determines whether there are non-workable versions of the available version protocols. If there are any non-workable versions, the version manager 350 determines if there are subsets of nodes in the cluster at step 723. If there are not any non-workable versions, at 722 the version manager 350 commits the version. If there are any subsets of the nodes in the cluster, the version manager picks the subset of nodes in the cluster to achieve a quorum at step 725 and commits potential valid versions of the current running versioned protocol to the quorum nodes at step 717.

If there isn't a subset of nodes to form a quorum, the version manager 350 waits for membership in the cluster to change in order to achieve a quorum at step 724 and communicates the potential versions of the current running versioned protocol to the joining node.

Figure 8:
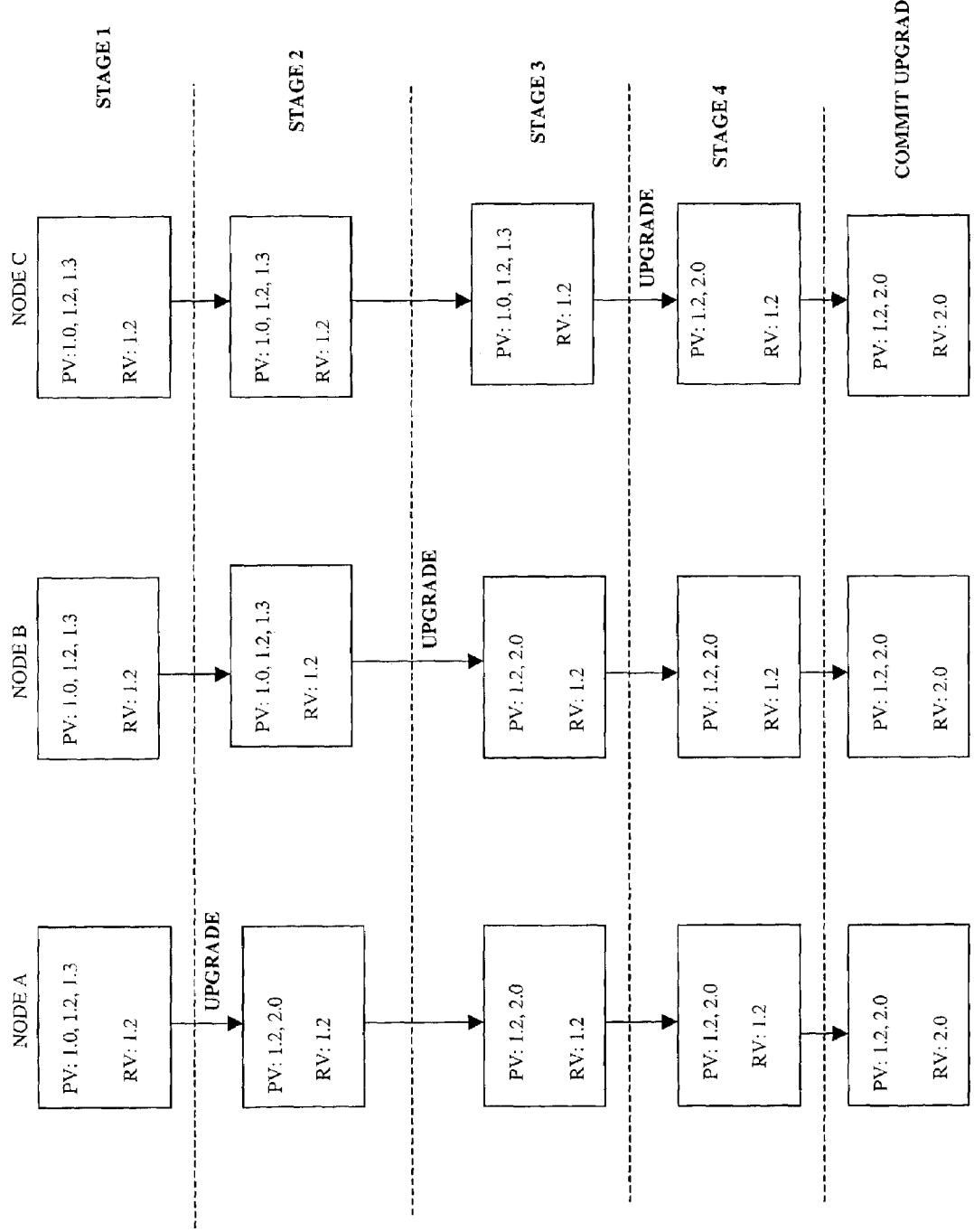
FIG. 8 is a block diagram of one embodiment of a software version upgrade in accordance with the present invention.

FIG. 8 is a block diagram illustration of one embodiment of a software version upgrade in a cluster environment 800. Environment 800 comprises nodes A-C. In the example in FIG. 8, nodes A, B and C will be upgrading the running version system "RV" from version 1.2 to version 2.0. Versions consist of major and minor numbers, with the convention that minor number indicate upwardly compatible changes and major numbers indicate upward incompatibility. This is a convention enforced (or not) by the components using the version manager, not the version manager itself. The only interpretation the version manager makes on version is that higher versions are more desirable than lower ones. FIG. 8 further illustrates one embodiment of a rolling upgrade of the present invention. In a rolling upgrade, different versions of the software will be running on nodes A-C. The older version (e.g., RV 1.2) is not able to know anything about the newer version 2.0 so the new version 2.0 must cooperate with the old version 1.2. This requires the version manager 350 to know what version of software is running in each node and the protocol the cluster 800 as a whole (in the case of a distributed protocol) is using.

System "RV" uses a distributed protocol, and a system administrator may have determined that it is easier to upgrade it 1.2 to 2.0 all at once, rather than having individual pairs of nodes communicate differently depending on what software was installed. Therefore, system "RV" needs to run protocol version 1.2 through the entire upgrade until the commit, and then switch to 2.0. We will refer to node which support version 1.2 and no higher as the "old" nodes (e.g., nodes A, B and C), and nodes which support version 2.0 as the "new" nodes. At the start of the upgrade, the entire cluster will consist of old nodes.

The string "RV" is used as the unique identifier for the versioned protocol. Because the old nodes already support 1.2, we know that each of these nodes will have a definition for "RV" that indicates version 1.2, and perhaps other versions, that can be supported. The new nodes will have a definition for "RV" that indicate both versions "1.2" and "2.0" can be supported.

The definition for "RV" will also indicate that its is maintained in cluster-mode, with a single running version maintained for the entire cluster 800. Because all the old nodes support 1.2, and we presume that the last upgrade was committed, the running version will be the same on all nodes A-C in the cluster 800. It will also ensures that any node not supporting the running version of a cluster-wide protocol will not be able to join the cluster 800. For example, if an old node that had not booted up since before the last upgrade suddenly started up and tried to join the cluster 800, and it either did not have a versioned protocol for "RV", or had versioned protocol for "RV" that indicated version 1.2 was not supported, that node would not allowed to join the cluster 800.

When the first node (e.g., node A) is upgraded, system "RV" queries the version manager 350 for the running version of "RV" and it is informed that it is 1.2. The system then starts communicating with other nodes using the 1.2 protocol. Because the software on the first new node can also support a higher version, it registers with the version manager to receive an upgrade callback. Upgrade callback registrations are independent of the versioned protocol specification, although they are tied to a given versioned protocol name. They can be made by any component that wants to upgrade to a higher version at some future time. Arguments for the registration include the name of the versioned protocol to associate with the callback, and other optional arguments.

Referring to FIG. 8, at each of stages 2 through 4 as each node A-C is upgraded, it continues to communicates using version 1.2, and registers for an upgrade callback. At some point, all nodes will be new nodes, and will still be communicating using 1.2 of the "RV" protocol. If an old node were to be booted back into cluster 800, it would be able to join the cluster 800.

After all nodes have had system "RV" upgraded to version 2.0, an administrator may commit the upgrade at the commit stage. At this point, the version manager 350 will look through all the versioned protocols in the cluster 800 and determine which could have a higher running version, based on the definitions on each node. The definitions for "RV" will indicate that 2.0 can be run on every node, so components that have registered for upgrade callbacks associated with "RV" will receive them. The callback will explicitly indicate what version has been chosen as the new running version, in case some subset of the nodes can support an even higher version at the commit stage.

System "RV" may then switch to using version 2.0 during the commit stage. Depending on the implementation, this switch could be as simple as narrowing an object reference to a different interface, or it could require other forms of inter-node communication or synchronization, which will be built with existing communications infrastructure and not directly involve the version manager.

When version 2.0 becomes the running version of "RV", any node not able to support that version will no longer be able to join the cluster 800, which will allow system "RV" to make some assurances. If there is a future upgrade (e.g., from version 2.0 to 2.1) the versioned protocol on the newer node will specify that it supports both 2.0 and 2.1 and therefore will be able to join cluster 800.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A version management system having a processor, said system, comprising:

a plurality of application programs interfaces (APIs) for allowing components running on a plurality of nodes to inter-operate in a distributed computer network system;

a plurality of specification files associated with each of the plurality of nodes, each of said plurality of specification files comprising a set of software versions supported by said version management system and storing specification defining information unique to versioned protocols utilized by said plurality of nodes;

wherein the specification files are grouped according to a mode specified therewith, the mode selected from a node mode, a node-pair mode, a cluster mode and a mode distinct from the node, node-pair and cluster modes;

a query interface for allowing said components in said distributed computer network system to specify a current running version of software said component requires;

registration logic for allowing said components to register for said software version upgrade when said current running version of said versioned protocol changes;

a custom interface for allowing said components to determine a choice of running version; and compare logic for enabling said version management system to compare said specification files in a cluster node environment to determine the version information of said versioned protocol that is active in a node.

2. The system of claim 1, further comprising administration logic for parsing said plurality of specification files to keep track of running versions of software on nodes in said network computer system.

3. The system of claim 2, further comprising version event call back interface for informing said plurality of components of various states to changes in a corresponding versioned protocol.

4. The system of claim 3, wherein said versioned protocol is maintained in the node mode specified to enable said version management system to manage running versions of a particular versioned protocol independently on each of said plurality of nodes.

5. The system of claim 3, wherein said versioned protocol is maintained in the cluster mode specified to enable said version management system to maintain a single running version of said versioned protocol for an entire cluster of said plurality of nodes.

6. The system of claim 3, wherein said versioned protocol is maintained in the node-pair mode specified to enable said versioned management system to maintain running versions of said versioned protocol for each node pair in a cluster of said plurality of nodes.

7. The system of claim 2, wherein said plurality of specification files each comprise version information that specifies a particular version with a set of dependencies on other versioned protocols for said version of said versioned protocol that supports a particular node.

8. The method of claim 1, wherein said plurality of specification files each comprise upgrade information that said version specifies to determine a range of version upgrades for said version.

9. A multi-node computer system, comprising:
a plurality of nodes running a variety of versions of software;
a software version manager for managing and to maintain compatible running versions of software on said plurality of nodes;
wherein the software version manager comprises a plurality of specification files, each of said files comprising a set of software versions supported by said version management system and storing specification defining information unique to versioned protocols utilized by said nodes;
means for monitoring said software versions on said plurality of nodes to determine when said software versions are upgraded;
wherein the monitoring means comprises:
means for parsing the versioned protocol specification files according to a mode specified therewith, the mode selected from a node mode, a node-pair mode, a cluster mode and a mode distinct from the node, node-pair and cluster modes; and
a plurality of communication interfaces.

10. The computer system of claim 9, wherein said software version manager further provides support for rolling upgrades of said running versions of software on said plurality of nodes in the cluster mode environment.

11. The computer system of claim 10, wherein said software version manager comprises a query interface for allowing said plurality of nodes to determine particular versions of said running versions of software picked by said version manager.

12. The computer system of claim 11, wherein the software version manager further comprises a call back interface for allowing said version manager to communicate with each of said plurality of nodes during a software version upgrade commit state to upgrade said running versions of software on each of said plurality of nodes.

13. The computer system of claim 12, wherein said software version manager further comprises an applications program interface for allowing components in each of said plurality of nodes inter-operate with corresponding older components on other nodes using a versioned protocol.

14. The computer system of claim 13, wherein said versioned protocol comprises files defining specifications of uniquely named entities managed by said software version manager.

15. The computer system of claim 14, wherein said specifications comprise version information of protocols that may run on each of said plurality of nodes.

16. The computer system of claim 15, wherein said specifications further comprise delivery information on a method of delivering upgraded versions of a particular versioned protocol.

17. The computer system of claim 16, wherein said software version manager further comprises a custom interface for allowing said plurality of nodes to influence a choice of said running versions of software based on dynamic information allowing said versioned protocols to be used to capture runtime conditions in each of said plurality of nodes.

18. The computer system of claim 17, wherein said software version manager further comprises registration logic for allowing said components to register for said software version upgrade when said current running version of said versioned protocol changes.

19. A method of dynamically managing software versions in a computer system, said method comprising:
providing a version manager for managing changes to versions of software, which define versioned protocols in a plurality of nodes in said computer system;
monitoring said software versions on said plurality of nodes to determine when said software versions are upgraded;
wherein the monitoring comprises:
parsing the versioned protocol specification files of each of the nodes; and grouping the versioned protocol specification files according to a mode specified therewith, the mode selected from a node mode, a node-pair mode, a cluster mode and a mode distinct from the node, node-pair and cluster modes;

generating a versioned protocol specification on any of said plurality of nodes to define whether said node requires said software version upgrade;

upgrading said versioned protocol in said computer system; and committing any one of said plurality of nodes requiring said software version upgrade to said upgraded versioned protocol.

20. The method of claim 19, wherein said version manager provides support for rolling upgrades of running versions of software on said plurality of nodes in a cluster mode environment.

21. The method of claim 20, wherein said version manager further provides a query interface for allowing said plurality of nodes to determine particular versions of said software versions monitored by said version manager.

22. The method of claim 21, wherein software version manager further provides a call back interface for allowing said version manager to communicate with each of said plurality of nodes during a software version upgrade commit state to upgrade said software versions on any of said plurality of nodes.

23. The method of claim 22, wherein said version manager further provides an applications program interface for allowing components in each of said plurality of nodes to inter-operate with corresponding older components on other nodes using said versioned protocol.

24. The method of claim 23, wherein said versioned protocol comprises files defining specifications of uniquely named entities managed by said software version manager.

25. The method of claim 24, wherein said specifications comprise version information of protocols that may run on each of said plurality of nodes.

26. The method of claim 25, wherein said specifications further comprise delivery information on a method of delivering upgraded versions of a particular versioned protocol.

27. The method of claim 25, wherein said software version manager further comprises a custom interface for allowing said plurality of nodes to influence a choice of said running versions of software based on dynamic information allowing said versioned protocols to be used to capture runtime conditions in each of said plurality of nodes.

28. The method of claim 27, wherein said software version manager further comprises registration logic for allowing said components to register for said software version upgrade when said current running version of said versioned protocol changes.

* * * * *